3,507,685
METHOD OF PREPARING AN ANCHOR COATED CELLULOSIC BASE MATERIAL
Samir K. Banerjee, Claymont, Del., assignor to FMC Corporation, Philadelphia, Pa., a corporation of Delaware
No Drawing. Filed Sept. 29, 1967, Ser. No. 671,562
Int. Cl. B44d 1/14; D06m 13/12, 13/34
U.S. Cl. 117—76                                        3 Claims

ABSTRACT OF THE DISCLOSURE

A composite article comprising a cellulosic base member, an anchor coating material bonded thereto through an intermediate cross-linking agent and a synthetic thermoplastic resin coating composition firmly anchored to the base, as well as the method of its preparation, is disclosed herein.

---

In the past, many resinous materials have been proposed as anchoring means between a cellulosic base, including paper, wood, fabric, and film, and a normally non-adherent resin coating composition. Desirably, the anchoring means adheres strongly both to the substrate and the coating in very minute amounts, to provide a composite article which should not come apart even when exposed to severe moisture conditions. Among the more important anchoring systems which have been used are the water-soluble or dispersible aldehyde condensation products, e.g., phenol-formaldehyde, urea-formaldehyde, melamine-formaldehyde, etc., as disclosed, for example, in United States Patents Nos. 2,159,007 and 2,394,009; and the polyalkylene-imines, e.g., polyethylenimine, polypropylenimine, etc. as disclosed, for example, in German Patent No. 753,191 and United States Patents Nos. 2,940,889 and 2,999,782. While these resinous anchoring materials have been effective, certain problems arise with their use and it has been found necessary to search for improved methods for the adhesion of coating compositions to cellulosic base materials. In the case of aldehyde precondensates, for example, the anchoring agent produces a satisfactory bond with certain synthetic thermoplastic resin coating compositions but a poor bond with other resin coatings. The polyalkylene-imines are also better agents for certain resin coatings than others and, in addition, produce undesirable blocking during the manufacture of such anchor treated articles as regenerated cellulose film and paper. Furthermore, this material is water-sensitive and is not as satisfactory in aqueous coating procedures.

It is a principal object of this invention to provide a cellulosic base material to which synthetic thermoplastic resin coatings are more firmly attached.

It is another object of this invention to provide a non-blocking anchor coated cellulosic base material.

It is another object of this invention to provide a cellulosic base material having a polyalkylene-imine anchor coating which adheres much more strongly to the base and is much less water sensitive.

It is another object of this invention to provide a cellulosic base material having a polyalkylene-imine anchor coating which adheres much more strongly to the base and is much less water sensitive.

It is another object of this invention to provide a composite article including a cellulosic base material and a synthetic thermoplastic resin coating composition more firmly bonded thereto.

It is another object of this invention to provide a method of preparing an anchor coated cellulosic base material having improved adhesion properties.

These and other objects are attained in accordance with this invention which comprises a cellulosic base material and a polyalkylene-imine anchor coating chemically bonded to at least one surface of said base by means of an intermediate aldehyde cross-linking agent.

Various synthetic thermoplastic resin coating compositions are more strongly bonded to the cellulose substrate by means of the chemically bonded anchoring material.

This invention also includes a method of preparing the anchor-coated cellulosic base wherein the cellulosic substrate is treated with a polyalkylene-imine and an aldehyde cross-linking agent.

The cellulosic base material of this invention is cellulose or a cellulose derivative, for example, cellulose ethers including alkyl celluloses, hydroxyalkyl celluloses, carboxyalkyl celluloses, cyanoalkyl celluloses, cellulose thiourethanes and the like; cellulose esters such as cellulose nitrates, cellulose nitrites, cellulose phosphates, cellulose thiocyanates, cellulose carboxylates, e.g. cellulose acetate, cellulose triacetate, cellulose propionate, cellulose butyrate, and mixed cellulose carboxylates, e.g. cellulose acetate-propionate; mixed cellulose ether-esters; oxidation derivatives of cellulose; and the like. The cellulose derivatives all contain some free hydroxyl groups which are available for chemical reaction or cross-linking with the aldehyde. For example, commerically available cellulose triacetate has no less than 92% acetylated hydroxyl groups but still retains some free hydroxyl units whereby cross-linking will occur.

The cellulosic base member has a variety of physical forms including regenerated cellulose and cellulose derivative films, ribbons, and bands; fibrous material, e.g., filaments, yarns, staple fibers, including cotton and manufactured staple, woven and non-woven textile fabrics, sheets of pulp and paper, wood, pressed wood or hardboard; and miscellaneous shapes including sponges. The cellulosic base member may contain minor amounts of ingredients including plasticizing agents, dyes and pigments, filters, resins, delustering agents, and the like. The preferred form of base member which, so far, has been found to have the most utility with the present invention is a cellulosic film, particularly regenerated cellulose or hydroxyalkyl cellulose films or non-fibrous sheets.

The "aldehyde cross-linking agent" of this invention is, in general, a 1–4 carbon atom containing aliphatic mono-, di- or polyaldehyde or polymer thereof including, for example, formaldehyde, acetaldehyde, paraformaldehyde, paraldehyde glyoxal, and the like. These materials are readily soluble in water in the amounts used for application to the cellulosic base material. Formaldehyde is the preferred agent because it is inexpensive and readily available.

The aldehyde cross-linking agent is conveniently applied to the cellulosic base material from aqueous solutions in an amount ranging from about 0.01% to about 0.5%, preferably from about 0.05 to about 0.1%, based on the weight of the solution.

Catalysts for the cross-linking agent are not particularly necessary to the invention, but may be employed where they do not interfere with the purposes thereof.

The polyalkylene-imines of this invention include, for example, polyethylene-imines, polypropylene-imines, polybutylene-imines, polypropylethylene-imine, and others comprising recurring ethylene-imine groups. Preferable, polyethylene-imines which are water-soluble and have specific viscosities, when measured in a 1% aqueous solution at 25° C. of at least 0.15 are used for this invention because of their availability, lower volatility and ease of application.

The polyalkylene-imine is conveniently applied to the cellulosic base in an aqueous solution at a concentration of from about 0.05 to about 1.0%, preferably from 0.1 to 0.5%, based on the weight of the solution. If desired, the polyalkylene-imine may be applied from other solutions including lower alcohols or mixtures of water and lower alcohols.

The pH at which the polyalkylene-imine solution is applied is not critical with respect to improved anchorage properties. However, when the composite product must be substantially colorless, the anchor treatment should be made at or about a neutral condition. In general, a pH range of from about 3 to 10 will produce satisfactory anchorage, while higher and lower pH conditions lead to excessive blocking for the anchor-coated cellulosic base. The acidity of the anchoring agent may be controlled, for example, by the addition to the solution of dilute mineral acids, buffering agents, organic acids, etc.

The synthetic thermoplastic resin coating compositions of this invention include all forms of film-forming thermoplastic resins and preferably resins including as a polymerized or copolymerized monomer component an ethylenically unsaturated compound having the general formula

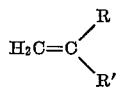

wherein R and R' are the same or different radicals. Examples of said compounds include vinyl halides, vinyl acetate, vinyl propionate, vinyl alkyl ethers, vinyl pyridine, vinyl pyrrole, vinyl allyl acetate, vinyl naphthalenes, alkyl vinyl ketones, vinylidene halides, acrylonitrile, acrylamide, acrolein, styrenes, acrylic and methacrylic acid, esters of acrylic and methacrylic acid, butadiene, isobutylene, chloroprene, ethylene, propylene, and the like.

The above compounds are formed into homopolymers or interpolymers with other similar ethylenically unsaturated monomers and/or other polymeric modifying substances, e.g. alpha beta unsaturated polycarboxylic acids or their anhydrides including maleic, fumaric, citraconic, itaconic, glutaconic, and the like. As an example, vinyl chloride and vinyl acetate copolymers; vinyl chloride, vinyl acetate and maleic anhydride interpolymers; vinyl chloride and vinylidene chloride copolymers; vinylidene chloride and methyl methacrylate copolymers; vinylidene chloride, acrylonitrile and itaconic acid interpolymers; and the like.

The coating compositions include, for example, additive materials for improving the coating characteristics as well as blends of the film-forming resins. Such additives are well-known and include waxes or wax-like materials, clays, rosin-type blending agents, plasticizers, lubricants, coloring agents, slip and anti-blocking agents other than clays, and the like.

The coatings are generally applied from organic solvent solutions or from aqueous media (latices), but may be formed in situ on the anchor-treated cellulosic substrate. Preformed film coatings, either directly from melt extrusion apparatus or from rolls, are also applied to the anchor-treated base to obtain a composite article of strong interfacial adhesion. Coating and laminating techniques, as mentioned above, are well-known and need not be discussed further here.

For the purposes of this invention, it is advantageous, from a process standpoint, to anchor treat the cellulosic base member while it is wet. This permits faster and more complete impregnation of at least the surface of the base with the preferred treating solutions. More preferably, cellulosic base members, such as regenerated cellulose or hydroxyalkyl cellulose ether films, are treated in the wet gel state to facilitate the anchoring treatment during high speed manufacture of the pellicles.

The aldehyde cross-linking agent may be applied to the cellulosic base member before or after the application of the polyalkylene-imine, but should not be applied from the same solution, since premature chemical modification of the polyalkylene-imine will occur, thereby destroying its effectiveness as an anchoring material. In the preferred embodiment of the process of this invention, the cellulosic base is first treated with the aldehyde cross-linking agent and then the polyalkylene-imine to provide more improved results.

In theory, the aldehyde, when applied to the cellulosic base, will react to cross-link the molecular chains, as is well recognized. Application of the polyalkylene-imine, however, to the same cellulosic base containing the aldehyde results in cross-linking of the aldehyde both with the cellulosic molecules and the polyalkylene-imine molecules whereby a cross-chemical bond between the cellulosic base and polyalkylene-imine anchor coating occurs. This results in a surface which is itself more firmly bonded to the substrate and to which top coatings of synthetic thermoplastic resin composition more firmly unite.

The following examples, which employ regenerated cellulose films as the substrate, are set forth to demonstrate the invention.

EXAMPLES

Wet gel regenerated cellulose films were obtained by continuously spinning viscose under standard coagulation, regeneration and wet processing conditions. Wet films having a thickness when dry of about 1 mil and a width of 6–7 inches were run through an aqueous bath containing between 0.05 and 0.1 weight percent of formaldehyde at 40° C. for a treatment time of 10 to 12 seconds. The films then passed into an aqueous bath containing from 0.1 to 0.5 weight percent polyethylene-imine (mol. wt. 30,000–40,000), 9.0 weight percent glycerine and sufficient lactic acid to maintain the pH of the bath at 7 to 7.5. This bath was also maintained at about 40° C. and the dwell time was 10 to 12 seconds. Some runs were modified by running the film through a water bath between the aldehyde and anchor plasticizing baths.

The anchored and plasticized films were dried over a steam heated roller to a moisture content of 5 to 6%. The films had a polyethylene-imine pickup of about 0.3% by weight.

The dried films were stored in the form of tightly wound rolls for two days at room temperature and then unwound and lacquer coated. No blocking tendency of the films during unrolling was noted.

In addition to the above anchoring procedures, wet gel cellulose film was also anchor treated with a conventional melamine-formaldehyde precondensate anchoring agent under varying conditions.

The anchored films, prepared as described above, were top coated with conventional heat-sealable thermoplastic resin coating compositions and tested for anchorage properties. The following table lists the conditions and results of the test procedures. Sufficient lactic acid was present in the aqueous anchoring bath to maintain a substantially neutral pH.

TABLE I.—VINYL COATING *

| | Anchoring Treatment | | | Heat seal, gms./2 inches | Boiling water test (sec.) |
|---|---|---|---|---|---|
| | Bath 1 | Bath 2 | Bath 3 | | |

| Run No.: | | | | | |
|---|---|---|---|---|---|
| 1 | 0.3% M-F [1] plus lactic acid | | 9% glycerine | 177-185 | 19 |
| 2 | 0.25% PEI [2] plus lactic acid | | do | 200-250 | 40 |
| 3 | Water | | 9% glycerine plus 0.25 PEI [2] plus lactic acid | 200-300 | 31 |
| 4 | 0.1% HCHO [3] | | 9% glycerine plus 0.25 PEI [2] plus lactic acid | 800-1,000 | 400+ |
| 5 | 0.3% M-F [1] plus lactic acid | Water | 9% glycerine plus 0.1% HCHO [3] | 100-200 | 17 |
| 6 | 0.25% PEI [2] plus lactic acid | do | 9% glycerine 0.1% HCHO [3] | 280-320 | 40 |
| 7 | 0.1% HCHO [3] | do | 9% glycerine plus 0.25% PEI [2] plus lactic acid | 500-600 | 250 |
| 8 | 0.1% HCHO [3] | do | 9% glycerine plus 0.3% M-F [1] plus lactic acid | 150-200 | 22 |

[1] M-F=melamine-formaldehyde precondensate available in 35% aqueous solution as Accobond 3524 from American Cyanamid Company.
[2] PEI=polyethylene-imine (mol. wt. 30,000-40,000).
[3] HCHO=formaldehyde.

* Vinyl Coating equals:

| Parts by weight | Ingredient |
|---|---|
| 53 | 87% vinyl chloride, 13% vinyl acetate copolymer. |
| 53 | 86% vinyl chloride, 13% vinyl acetate, 1% maleic anhydric interpolymer. |
| 5.3 | Polymerized rosin. |
| 4.3 | Paraffin wax. |
| 3.0 | Liquid vinyl plasticizer. |
| 2.0 | Clay. |

The above coating composition was dissolved in a mixture of 1,510 parts of ethyl acetate and 1,570 parts of toluene. The coating lacquer was applied to the base film and the solvent evaporated.

The heat seal test reported in the above table involved heat sealing two 2-inch square sections of strips of coated film together in transverse relationship at a temperature of 300° F. The films were then pulled apart in the machine direction by a Suter Tester apparatus which measures the seal breaking load.

The boiling water anchorage test was a determination of the time required for a 30 gm. attached weight to separate 2 inches of coated heat sealed film immersed in boiling water.

It is quite evident from the results of Runs Nos. 4 and 7 of the above table compared to other runs, that the present invention provides an unexpected and extremely improved anchorage of the vinyl resin coating to the cellulose substrate. In Run No. 6, wherein the polyethylene-imine was first applied and the film run through a water bath and then through the aqueous formaldehyde bath, a distinct improvement in heat seal strength was observed.

The following table provides a similar demonstration using a Saran-type coating.

densate in Run No. 1. When the formaldehyde treatment is given, either before or after the polyalkylene-imine treatment, a much improved anchorage is obtained.

Improved anchorage results are similarly observed when employing other cellulose and cellulose derivative fibrous and non-fibrous base materials with various synthetic thermoplastic resin coating compositions, as previously described.

I claim:
1. A method of preparing an anchor coated cellulosic base material consisting essentially of at least a two-step treatment of said base material, the first of said steps being the treatment of at least a surface of said base material with a composition consisting essentially of an aliphatic aldehyde cross-linking agent wherein the aliphatic group has from 1 to 4 carbon atoms and the second step being the treatment of said surface of said base material with an adhesion promoting amount of a composition consisting essentially of a polyalkylene-imine, said aldehyde being present in an amount sufficient to cross-link

TABLE II.—VINYLIDENE CHLORIDE COPOLYMER COATING**

| | Anchoring Treatment | | | Heat gms./ 2 inches | Boiling water anchorage (sec.) |
|---|---|---|---|---|---|
| | Bath 1 | Bath 2 | Bath 3 | | |

| Run No.: | | | | | |
|---|---|---|---|---|---|
| 1 | 0.3% M-F plus lactic acid | Water | 9% glycerine | 626 | 112 |
| 2 | 0.25% PEI plus lacitc acid | do | 9% glycerine plus 0.1% HCHO | 773 | 500+ |
| 3 | Water | do | 9% glycerine plus 0.25% PEI lactic plus acid | 185 | 37 |
| 4 | 0.2% HCHO | do | do | 888 | 500+ |

**Vinylidene Chloride Copolymer Coating Composition equals:

| Parts by weight | Ingredient |
|---|---|
| 85 | 92% vinylidene chloride, 7% acrylonitrile, 1% interpolymerizable acid interpolymer. |
| 2 | Petroleum base synthetic wax. |
| 1 | Clay. |

The above coating composition was dissolved in a mixture of 1725 parts of tetrahydrofuran and 195.5 parts of toluene, applied to the anchor coated cellulose film and the solvent removed by evaporation.

Here again, the anchor treated substrate of this invention showed surprisingly good adhesion properties. Run No. 3 indicates that the polyalkylene-imine per se is not a particularly good anchoring material for Saran-type coatings, as compared to the melamine-formaldehyde preconwith both said base material and said polyalkylene-imine and drying the anchor coated cellulosic base material.

2. The method of claim 1 wherein said cellulosic base is a wet gel, non-fibrous regenerated cellulose sheet, said aldehyde is formaldehyde which is applied in an aqueous solution at a concentration ranging from about 0.01 to about 0.5%, based on the weight of the solution, and said polyalkylene-imine is polyethylene-imine, which is applied in an aqueous solution at a concentration ranging from about 0.05 to about 1.0%, based on the weight of the solution, said polyethylene-imine solution being maintained at a substantially neutral pH.

3. The method of claim 2 wherein a top layer of a film-forming polymer or copolymer of an ethylenically unsaturated monomer is applied over the anchored surface.

References Cited
UNITED STATES PATENTS

| | | | |
|---|---|---|---|
| 2,381,020 | 8/1945 | Wilkes et al. | 8—116.3 X |
| 2,796,362 | 6/1957 | Wooding et al. | 117—76 X |
| 2,940,889 | 6/1960 | Justice | 161—247 |
| 2,999,782 | 9/1961 | Justice et al. | 161—249 |
| 3,038,777 | 6/1962 | Daul et al. | 8—116.3 X |
| 3,173,752 | 3/1965 | Rowell et al. | 117—118 X |
| 3,366,505 | 1/1968 | Bisschops et al. | |

MURRAY KATZ, Primary Examiner

R. HUSACK, Assistant Examiner

U.S. Cl. X.R.

8—116.3, 116.4; 117—72, 118, 143, 145; 161—249, 250

PO-1050
(5/69)

UNITED STATES PATENT OFFICE
CERTIFICATE OF CORRECTION

Patent No. 3,507,685      Dated April 21, 1970

Inventor(s) Samir K. Banerjee

It is certified that error appears in the above-identified patent and that said Letters Patent are hereby corrected as shown below:

Column 1 - Cancel the last paragraph.

Column 2, line 46, change "filters" to --fillers--

Column 5, Table II, Run No. 2, change "lacitc" to --lactic--

Column 5, Table II, Run No. 3, change "lactic plus" to --plus lactic--

SIGNED AND SEALED
AUG 11 1970

(SEAL)
Attest:

Edward M. Fletcher, Jr.
Attesting Officer

WILLIAM E. SCHUYLER, JR.
Commissioner of Patents